(12) United States Patent
Horn et al.

(10) Patent No.: US 11,888,669 B2
(45) Date of Patent: Jan. 30, 2024

(54) SPACE FREQUENCY MULTI-USER SIGNALING AND TONE RESERVATION SIGNALING

(71) Applicant: QUALCOMM Incorporated, San Diego, CA (US)

(72) Inventors: Idan Michael Horn, Hod Hasharon (IL); Shay Landis, Hod Hasharon (IL); Gideon Shlomo Kutz, Ramat Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 37 days.

(21) Appl. No.: 17/353,292

(22) Filed: Jun. 21, 2021

(65) Prior Publication Data
US 2022/0407759 A1     Dec. 22, 2022

(51) Int. Cl.
*H04B 17/336* (2015.01)
*H04L 27/26* (2006.01)

(52) U.S. Cl.
CPC ....... *H04L 27/2618* (2013.01); *H04B 17/336* (2015.01)

(58) Field of Classification Search
CPC .......................... H04L 27/2618; H04B 17/336
See application file for complete search history.

(56) References Cited

U.S. PATENT DOCUMENTS

| | | | | |
|---|---|---|---|---|
| 7,822,131 B2* | 10/2010 | Chen | ..................... | H03F 1/3241 375/260 |
| 8,213,536 B2* | 7/2012 | Jethanandani | ...... | H04L 27/2618 375/377 |
| 8,275,067 B2* | 9/2012 | Garg | ..................... | H04M 11/062 375/296 |
| 8,885,736 B2 | 11/2014 | Garg et al. | | |
| 2006/0078066 A1* | 4/2006 | Yun | ....................... | H04B 7/0848 375/299 |
| 2009/0161796 A1* | 6/2009 | Fisher-Jeffes | ....... | H04L 27/3809 375/317 |
| 2011/0255620 A1* | 10/2011 | Jones, IV | ................ | H04L 27/22 375/260 |

(Continued)

FOREIGN PATENT DOCUMENTS

WO      WO-2009152038 A1 * 12/2009    ......... H04L 27/2618

OTHER PUBLICATIONS

International Search Report and Written Opinion—PCT/US2022/072532—ISA/EPO—dated Sep. 1, 2022.

(Continued)

*Primary Examiner* — Atique Ahmed
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit an indication of a tolerance for interference associated with peak-to-average-power-ratio (PAPR) signaling, the PAPR signaling including one or more of space frequency multi-user (SFMU) signaling or tone reservation signaling. The UE may receive, via a downlink channel, a downlink communication having the PAPR signaling applied to subcarriers of the downlink channel based at least in part on the indication of the tolerance for interference. Numerous other aspects are described.

30 Claims, 10 Drawing Sheets

(56) References Cited

U.S. PATENT DOCUMENTS

| | | | |
|---|---|---|---|
| 2013/0177115 A1* | 7/2013 | Yang | H04L 25/0202 |
| | | | 375/347 |
| 2013/0322563 A1* | 12/2013 | Van Zelst | H04L 27/2621 |
| | | | 375/295 |
| 2014/0146754 A1 | 5/2014 | Bayesteh et al. | |
| 2016/0192385 A1* | 6/2016 | Tooher | H04W 72/0446 |
| | | | 370/336 |
| 2018/0123851 A1* | 5/2018 | Mounzer | H04J 13/004 |
| 2018/0234854 A1* | 8/2018 | Zhang | H04W 74/0816 |
| 2018/0351624 A1* | 12/2018 | Hakola | H04B 7/0617 |
| 2019/0132084 A1* | 5/2019 | Zhang | H04W 72/0446 |
| 2020/0059960 A1* | 2/2020 | Shimezawa | H04L 1/1809 |
| 2021/0351885 A1* | 11/2021 | Chavva | G06N 3/04 |

OTHER PUBLICATIONS

Ivanov A., et al., "Unused Beam Reservation for PAPR Reduction in Massive MIMO System", 2018 IEEE 87th Vehicular Technology Conference (VTC Spring), IEEE, Jun. 3, 2018 (Jun. 3, 2018), 5 pages, XP033377364, DOI: 10.1109/VTCSPRING.2018.8417537, [retrieved on Jul. 20, 2018], Title Section I-V, figures 5-6, Sections II, III, Abstract.

Zayani R., et al., "PAPR-Aware Massive MIMO-OFDM Downlink", IEEE Access, vol. 7, Feb. 18, 2019 (Feb. 18, 2019), pp. 25474-25484, XP011713281, DOI: 10.1109/ACCESS.2019.2900128, [retrieved on Mar. 6, 2019], Sections I and III.

\* cited by examiner

SPACE FREQUENCY MULTI-USER SIGNALING AND TONE RESERVATION SIGNALING

FIELD OF THE DISCLOSURE

Aspects of the present disclosure generally relate to wireless communication and to techniques and apparatuses for space frequency multi-user signaling and tone reservation signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of a tolerance for interference associated with peak-to-average-power-ratio (PAPR) signaling, the PAPR signaling including one or more of space frequency multi-user (SFMU) signaling or tone reservation signaling. The method may include receiving, via a downlink channel, a downlink communication having the PAPR signaling applied to subcarriers of the downlink channel based at least in part on the indication of the tolerance for interference.

Some aspects described herein relate to a method of wireless communication performed by a base station. The method may include receiving, from one or more UEs, one or more indications of tolerance for interference associated with PAPR signaling, the PAPR signaling including one or more of SFMU signaling or tone reservation signaling. The method may include transmitting, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

Some aspects described herein relate to a UE for wireless communication. The user equipment may include a memory and one or more processors coupled to the memory. The one or more processors may be configured to transmit an indication of a tolerance for interference associated with PAPR signaling, the PAPR signaling including one or more of SFMU signaling or tone reservation signaling. The one or more processors may be configured to receive, via a downlink channel, a downlink communication having the PAPR signaling applied to subcarriers of the downlink channel based at least in part on the indication of the tolerance for interference.

Some aspects described herein relate to a base station for wireless communication. The base station may include a memory and one or more processors coupled to the memory. The one or more processors may be configured to receive, from one or more UEs, one or more indications of tolerance for interference associated with PAPR signaling, the PAPR signaling including one or more of SFMU signaling or tone reservation signaling. The one or more processors may be configured to transmit, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

Some aspects described herein relate to a non-transitory computer-readable medium that stores a set of instructions for wireless communication by a UE. The set of instructions, when executed by one or more processors of the UE, may cause the UE to transmit an indication of a tolerance for interference associated with PAPR signaling, the PAPR signaling including one or more of SFMU signaling or tone reservation signaling. The set of instructions, when executed by one or more processors of the UE, may cause the UE to receive, via a downlink channel, a downlink communication having the PAPR signaling applied to subcarriers of the downlink channel based at least in part on the indication of the tolerance for interference.

Some aspects described herein relate to a non-transitory computer-readable medium that stores a set of instructions for wireless communication by a base station. The set of instructions, when executed by one or more processors of the base station, may cause the base station to receive, from one or more UEs, one or more indications of tolerance for interference associated with PAPR signaling, the PAPR signaling including one or more of SFMU signaling or tone reservation signaling. The set of instructions, when executed by one or more processors of the base station, may cause the base station to transmit, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

Some aspects described herein relate to an apparatus for wireless communication. The apparatus may include means for transmitting an indication of a tolerance for interference associated with PAPR signaling, the PAPR signaling including one or more of SFMU signaling or tone reservation signaling. The apparatus may include means for receiving, via a downlink channel, a downlink communication having the PAPR signaling applied to subcarriers of the downlink channel based at least in part on the indication of the tolerance for interference.

Some aspects described herein relate to an apparatus for wireless communication. The apparatus may include means for receiving, from one or more UEs, one or more indications of tolerance for interference associated with PAPR signaling, the PAPR signaling including one or more of SFMU signaling or tone reservation signaling. The apparatus may include means for transmitting, via downlink channels of a cell provided by the apparatus, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
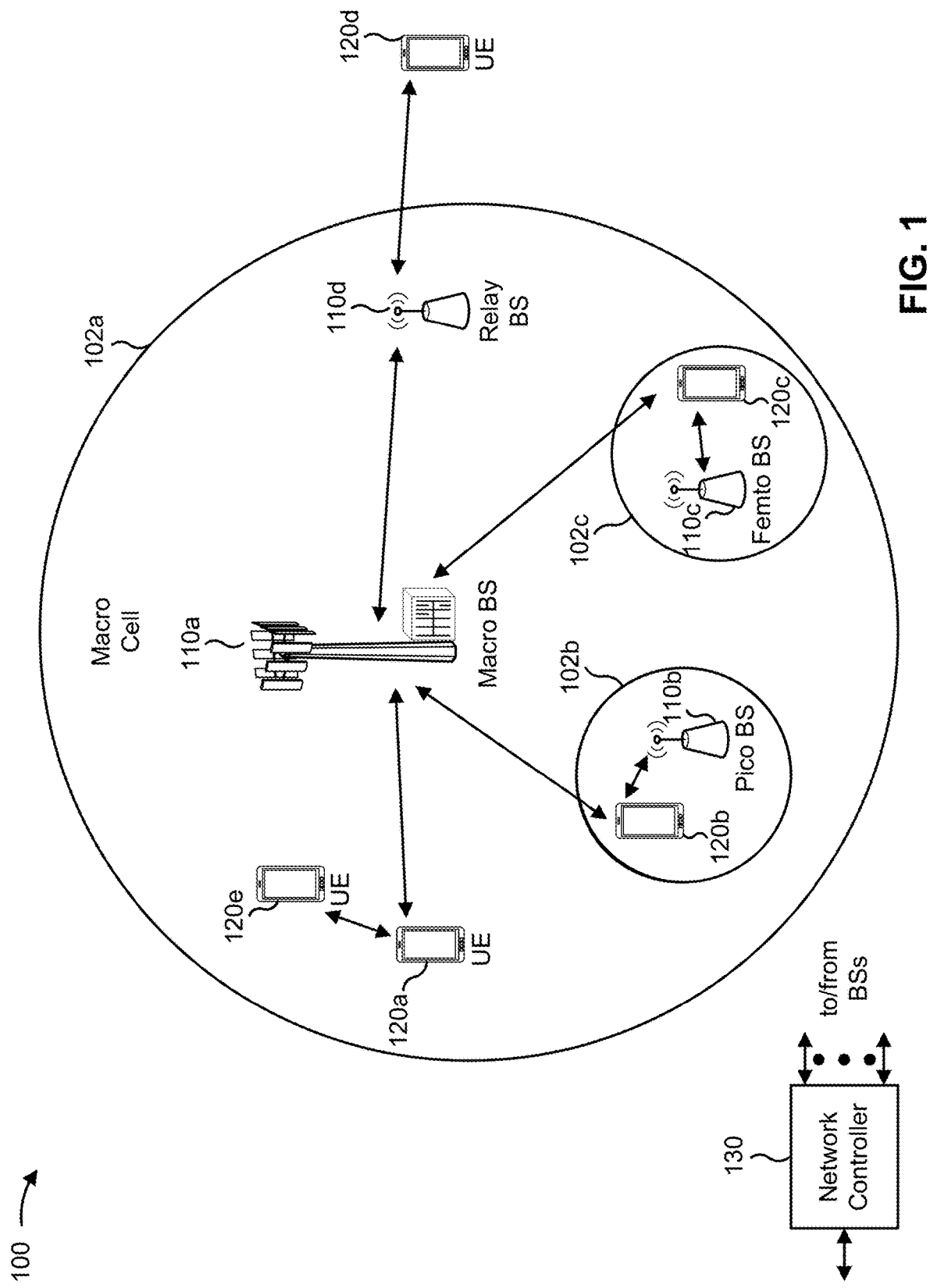
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of a tolerance for interference associated with PAPR signaling, the PAPR signaling including one or more of SFMU signaling or tone reservation signaling; and receive, via a downlink channel, a downlink communication having the PAPR signaling applied to subcarriers of the downlink channel based at least in part on the indication of the tolerance for interference. Additionally, or alternatively, the communication manager 140 may perform one or more other operations described herein.

In some aspects, the base station 110 may include a communication manager 150. As described in more detail elsewhere herein, the communication manager 150 may receive, from one or more UEs, one or more indications of tolerance for interference associated with PAPR signaling, the PAPR signaling including one or more of SFMU signaling or tone reservation signaling; and transmit, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference. Additionally, or alternatively, the communication manager 150 may perform one or more other operations described herein.

As indicated above, FIG. 1 is provided as an example. Other examples may differ from what is described with regard to FIG. 1.

Figure 2:
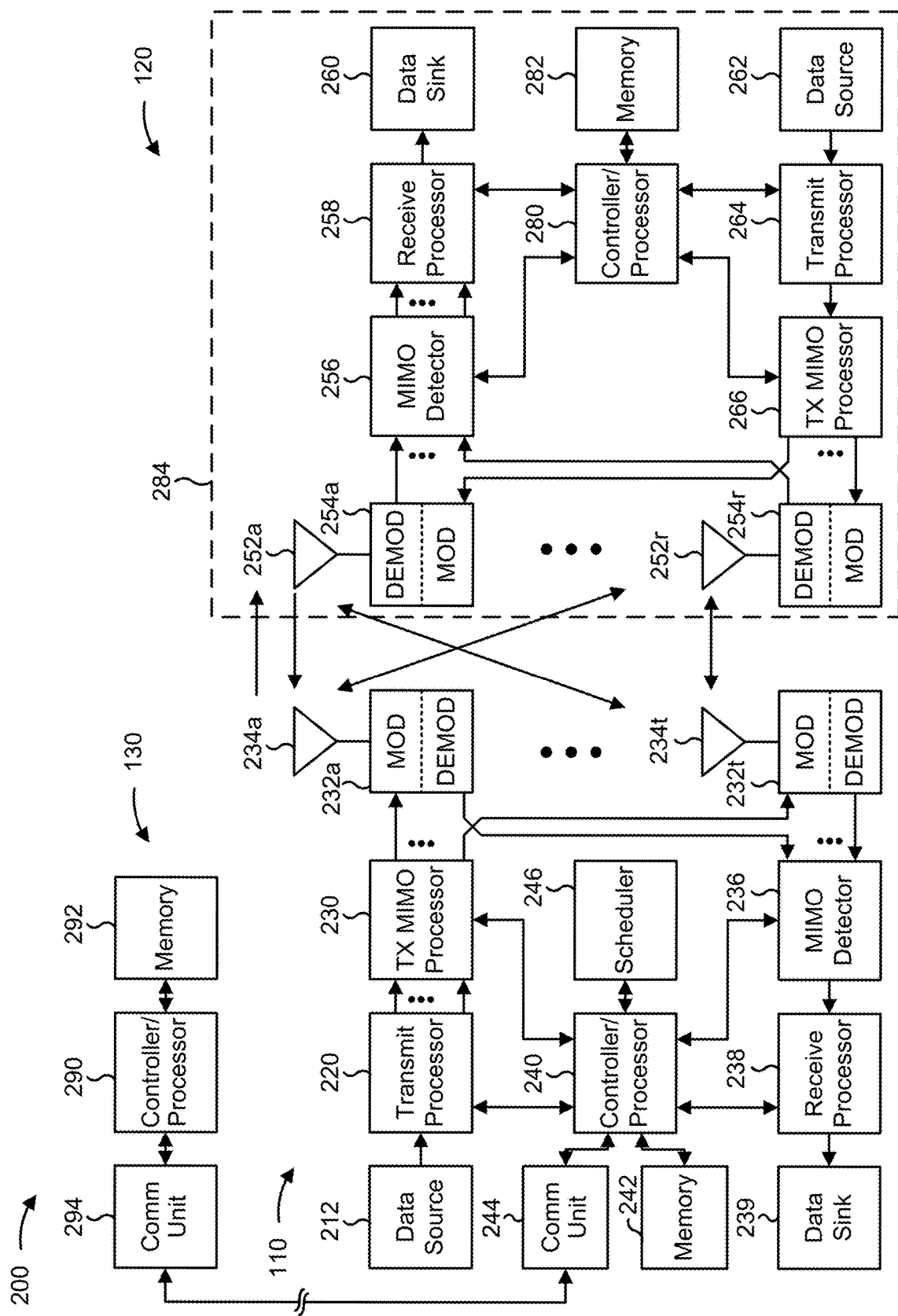
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with space frequency multi-user signaling and tone reservation signaling, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for transmitting an indication of a tolerance for interference associated with PAPR signaling (e.g., using controller/processor 280, transmit processor 264, TX MIMO processor 266, modem 254, antenna 252, memory 282, or the like), the PAPR signaling including one or more of SFMU signaling or tone reservation signaling; and/or means for receiving, via a downlink channel, a downlink communication having the PAPR signaling applied to subcarriers of the downlink channel based at least in part on the indication of the tolerance for interference (e.g., using antenna 252, modem 254, MIMO detector 256, receive processor 258, controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from one or more UEs, one or more indications of tolerance for interference associated with PAPR signaling (e.g., using antenna 234, modem 232, MIMO detector 236, receive processor 238, controller/processor 240, memory 242, or the like), the PAPR signaling including one or more of SFMU signaling or tone reservation signaling; and/or means for transmitting, via downlink channels of a cell provided by the base station, the PAPR signaling and one or more downlink communications associated with the one or more UEs (e.g., using controller/processor 240, transmit processor 220, TX MIMO processor 230, modem 232, antenna 234, memory 242, or the like), the PAPR signaling including one or more of channel response-based SFMU signaling or channel response-based tone reservation signaling applied based at least in part on the one or more indications of the tolerance for interference. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
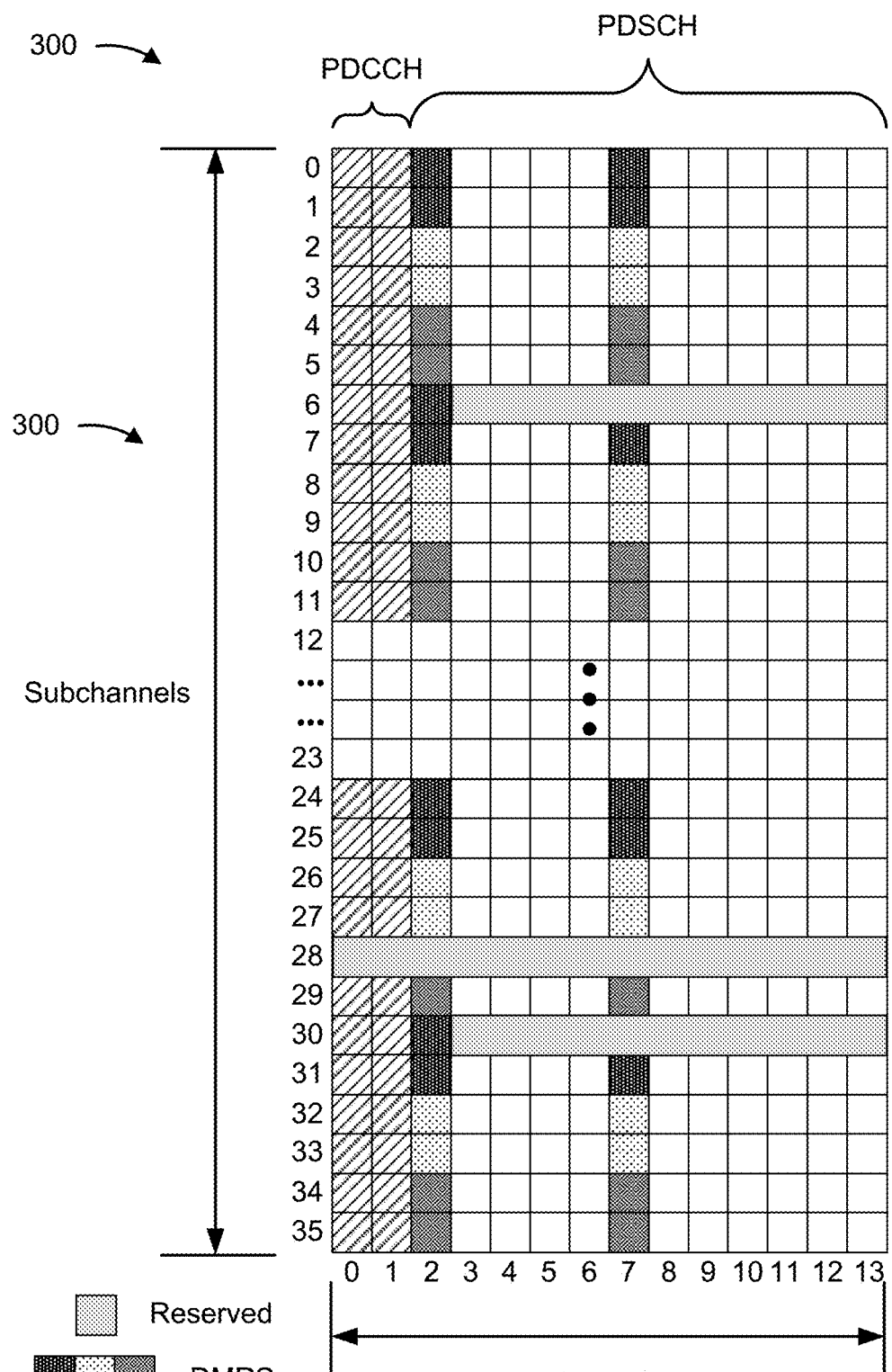
FIG. 3 is a diagram illustrating an example of subcarrier tone reservation, in accordance with the present disclosure.

FIG. 3 is a diagram illustrating an example 300 of UE subcarrier tone reservation on one or more subcarriers, in accordance with the present disclosure. In some networks, a base station may transmit a downlink transmission on a physical downlink shared channel (PDSCH) with tone reservation on one or more subcarriers based at least in part on measurement(s) of uplink signals from a UE, a request from the UE, an indication of a capability of the UE, and/or an independent determination by the base station, among other examples (e.g., as described herein).

In some aspects, the UE may be configured to communicate with the base station with a configuration for tone reservation. For example, the configuration may be common for multiple communications (e.g., for a configured grant and/or semi-persistent scheduling resources), multiple UEs connected to the base station, a beam provided by the base station, a cell provided by the base station, and/or the like.

As shown by example 300, a PDSCH may include one or more reserved subcarriers (e.g., tones) on which data and/or pilots are not to be transmitted. In some aspects, the subcarriers may be empty (e.g., not having any information intended for transmission to the UE). Additionally, or alternatively, tone reservation may be applied to physical downlink control channel (PDCCH) symbols (e.g., symbols 0 and 1 in FIG. 3). In some aspects, a pilot may include or may be a reference signal. In some aspects, the base station may transmit a signal that is configured to improve a peak-to-average-power ratio (PAPR) for a downlink transmission on the PDSCH by transmitting tone reservation signaling in place of data and/or pilots on the one or more reserved subcarriers. While example 300 provides an example of tone reservation applied to PDSCH and/or PDCCH, in some aspects (e.g., when a UE applies tone reservation to uplink communications transmitted to a base station), tone reservation may be applied to physical uplink shared channel (PUSCH) and/or physical uplink control channel (PUCCH) symbols.

The use of tone reservation may involve significant overhead that may decrease overall throughput. For example, to enable the UE to identify which subcarriers to discard (e.g., the reserved subcarriers), the base station may indicate the frequency locations (e.g., using identifiers) of the subcarriers to the UE. These indications may consume communication, network, and power resources (e.g., bits) for the base station to transmit (e.g., in downlink control information) and for the UE to receive. Additionally, or alternatively, consumption of the network resources for the indications may decrease throughput available for data (e.g., associated with the PDSCH). In a communication where tone reservation is not used, an increase in PAPR may occur, which may degrade communications between the base station and the UE, and may negatively affect an efficiency of power amplification at the base station. Based at least in part on degradation of the communications, the UE and/or the base station may consume power, communication, network, and computing resources to detect and/or correct communication errors associated with the degradation.

As indicated above, FIG. 3 is provided as an example. Other examples may differ from what is described with respect to FIG. 3.

Figure 4:
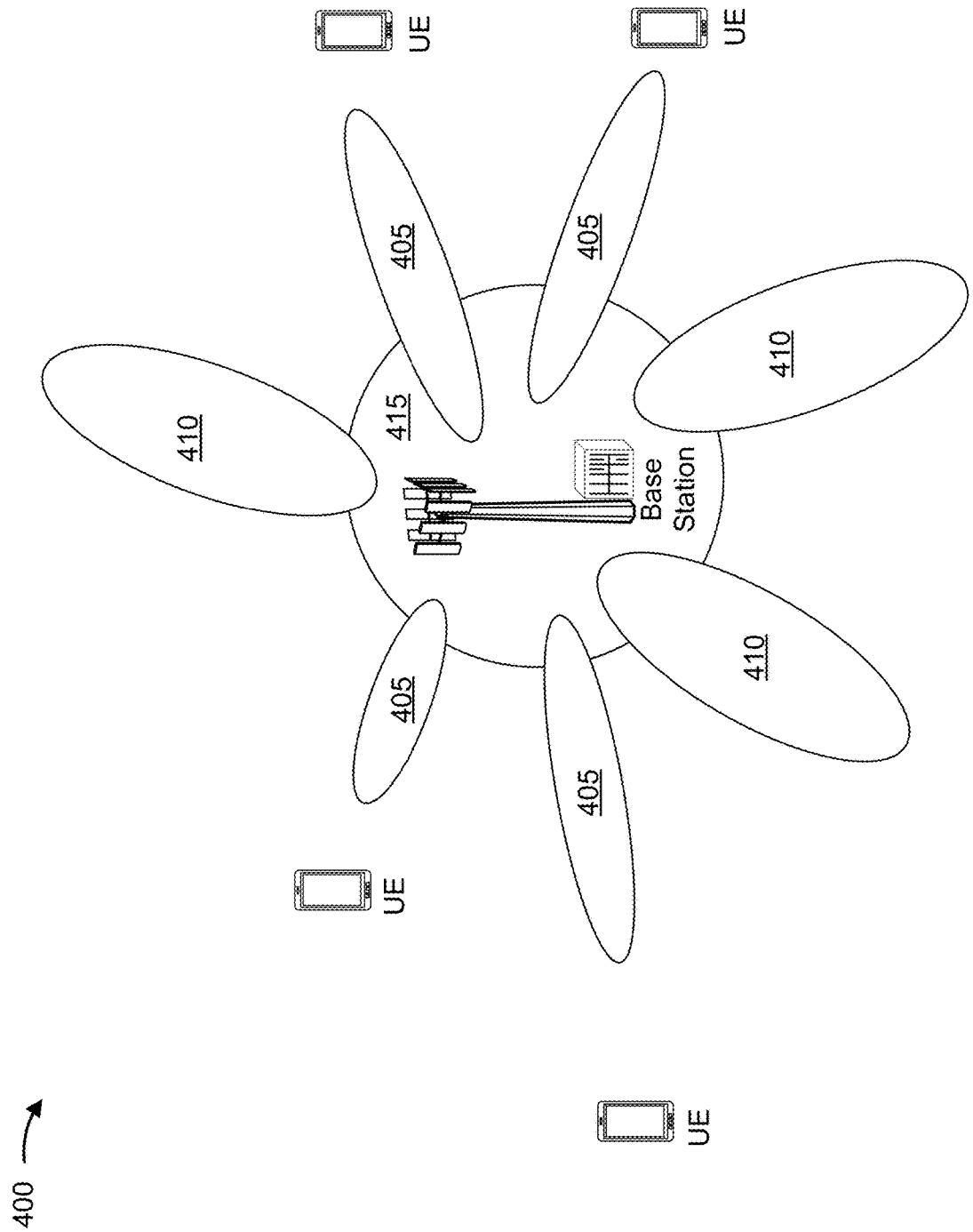
FIG. 4 is a diagram illustrating an example of SFMU signaling, in accordance with the present disclosure.

FIG. 4 is a diagram illustrating an example of SFMU signaling, in accordance with the present disclosure. In some networks, a base station may communicate with multiple UEs on a cell provided by the base station. The base station may communicate with the multiple UEs using beam-based communication channels.

As shown in FIG. 4, the base station may communicate with multiple UEs be via multiple serving beams 405. For example, the base station may communicate via at least one of the multiple UEs via each serving beam 405. The serving beams 405 may have different beam widths or may all have a same beam width. Serving beams 405 may cause noise for other serving beams 405 based at least in part on reflections and/or diffractions of the serving beams 405.

The base station may transmit PAPR reduction signaling using non-serving beams 410. The base station may transmit the PAPR reduction signaling to include SFMU signaling, which may allow the base station to transmit signals into unoccupied space. The SFMU signaling may reduce a power back-off at power amplifier inputs of the base station, which may improve power efficiency at the base station. Based at least in part on transmitting the SFMU signaling into unoccupied space (e.g., using precoding to direct the SFMU signaling to the non-serving beams, the base station may improve power resource consumption without significantly increasing noise on the serving beams 405.

Additionally, or alternatively, the base station may transmit PAPR reduction signaling using a pseudo omni-directional beam 415 based at least in part on transmitting the PAPR reduction signaling in directions of multiple beams (e.g., including serving beams 405). The base station may transmit the PAPR reduction signaling using the pseudo omni-directional beam 415 with a relatively low power that may be expected by the base station to cause relatively low interference with the serving beams 405. In this way, the base station may further reduce the power back-off at the power amplifier inputs of the base station, which may further improve power efficiency at the base station. However, transmitting the PAPR reduction signaling using the pseudo omni-directional beam 415 may cause enough noise and/or interference for the serving beams 405 to increase error rates, which may consume computing, network, communication, and power resources to detect and correct.

As indicated above, FIG. 4 is provided as an example. Other examples may differ from what is described with regard to FIG. 4.

In some aspects described herein, a base station may perform joint SFMU signaling and channel-based tone reservation signaling. For example, the base station may receive, from one or more UEs, indications of tolerance for interference associated with PAPR signaling, which includes SFMU signaling and tone reservation signaling (e.g., channel-based tone reservation signaling). The indications of the tolerance may indicate a tolerance for distorting loading for a full allocation, per subband, and/or per resource block, among other examples. The tolerance may be based at least in part on channel conditions (e.g., associated with a serving beam) and/or associated signal-to-interference-plus-noise ratios. The base station may use the indications of the tolerance to determine spatial domain, time domain, and/or frequency domain resources on which the base station may transmit PAPR signaling (e.g., signaling to reduce PAPR). For example, the base station may determine amounts of power that the base station may use to transmit PAPR signaling in different directions (e.g., associated with different beams), at different times (e.g., using wireless communication-based time units), and/or on different frequencies (e.g., based at least in part on channel knowledge). The base station may generate a data set (e.g., a 2-dimensional map) of tolerated (e.g., allowed by the UEs) distortion in frequency, space, and/or time. In some aspects, the base station may determine the tolerance for distortion based at least in part on uplink reference signals (e.g., sounding reference signals (SRSs)).

In some aspects (e.g., with an assumption of reciprocity between an uplink channel and a downlink channel), the UE may indicate the tolerance for a full allocation. The UE may transmit the indication of the tolerance relative to an average channel energy and the base station may adjust a distortion energy based at least in part on the tolerance for the full bandwidth as indicated by the report and based at least in part on the channel knowledge. In some aspects, the tolerance for the full allocation may include a tolerance floor, which may be uniform over the full allocation and/or relatively low compared to an additive white Gaussian noise AWGN floor. Based at least in part on the channel response, the base station may configure an energy of the tone reservation signaling on subcarriers (e.g., each subcarrier) to modify the channel response to satisfy the tolerance floor. For example, if the channel response indicates relatively high received energy, the tone reservation signaling may be configured with relatively small energy to satisfy the tolerance floor. Alternatively, if the channel response indicates relatively low received energy, the tone reservation signaling may be configured with relatively high energy. Based at least in part on using a single indication for the full allocation, a size of a report that includes the indication may be smaller, and may consume fewer network resources, than a per subband or a per resource block, among other examples. In some aspects, the UE may indicate the tolerance for the full allocation based at least in part on the base station supporting a combination of the reported distortion tolerance with a channel frequency response.

In some aspects (e.g., without an assumption of reciprocity between the uplink channel and the downlink channel), the UE may indicate tolerance with a granularity that is smaller than the full allocation (e.g., per subband or per resource block, among other examples).

The base station may apply joint SFMU and tone reservation optimization to optimize PAPR with a constraint of a maximum power (e.g., in different directions) based at least in part on the reporting of tolerance from the one or more UEs. For example, the base station may calculate a PAPR reduction signal, and project the PAPR reduction signal to the SFMU signaling and to the tone reservation signaling based at least in part on the reported tolerance (e.g., an error vector magnitude (EVM) tolerance). The base station may optimize the SFMU signaling and the tone reservation signaling to maximize PAPR reduction and to minimize UE performance loss (e.g., estimated based at least in part on the reported tolerance). In some aspects, the base station may use machine learning, constraint optimization, unconstraint optimization, and/or testing hypotheses iterations, among other examples, to optimize PAPR reduction and UE performance loss.

The UE may receive an indication that tone reservation is activated (e.g., that channel-response based tone reservation is applied to a downlink communication with tone reservation signaling transmitted on one or more subcarriers in place of data). The indication may include an indication of a number of subcarriers used for the tone reservation signaling. The number of subcarriers may be indicated explicitly or as a percentage of a full allocation for the downlink communication, among other examples. In some aspects, the UE may receive the indication within a radio resource control (RRC) message, downlink control information (DCI), and/or a medium access control (MAC) control element (MAC CE). The UE may estimate a channel response of the downlink channel based at least in part on data modulated reference signals (DMRSs) and/or data symbols of the downlink communication, and estimate locations of the tone reservation signaling (e.g., subcarriers having the tone reservation signaling transmitted in place of data) based at least in part on energies and/or capacities of subcarriers of the downlink communication. The UE may discard samples received on the subcarriers estimated as locations of the tone reservation signaling, and the UE may decode remaining subcarriers as data subcarriers.

Based at least in part on using PAPR reduction signaling that includes SFMU signaling and/or tone reservation signaling based at least in part on indicated tolerance of one or more UEs, the base station may improve power efficiency without significant UE performance loss. UE performance loss may consume power, communication, network, and/or computing resources to detect and correct.

Figure 5:
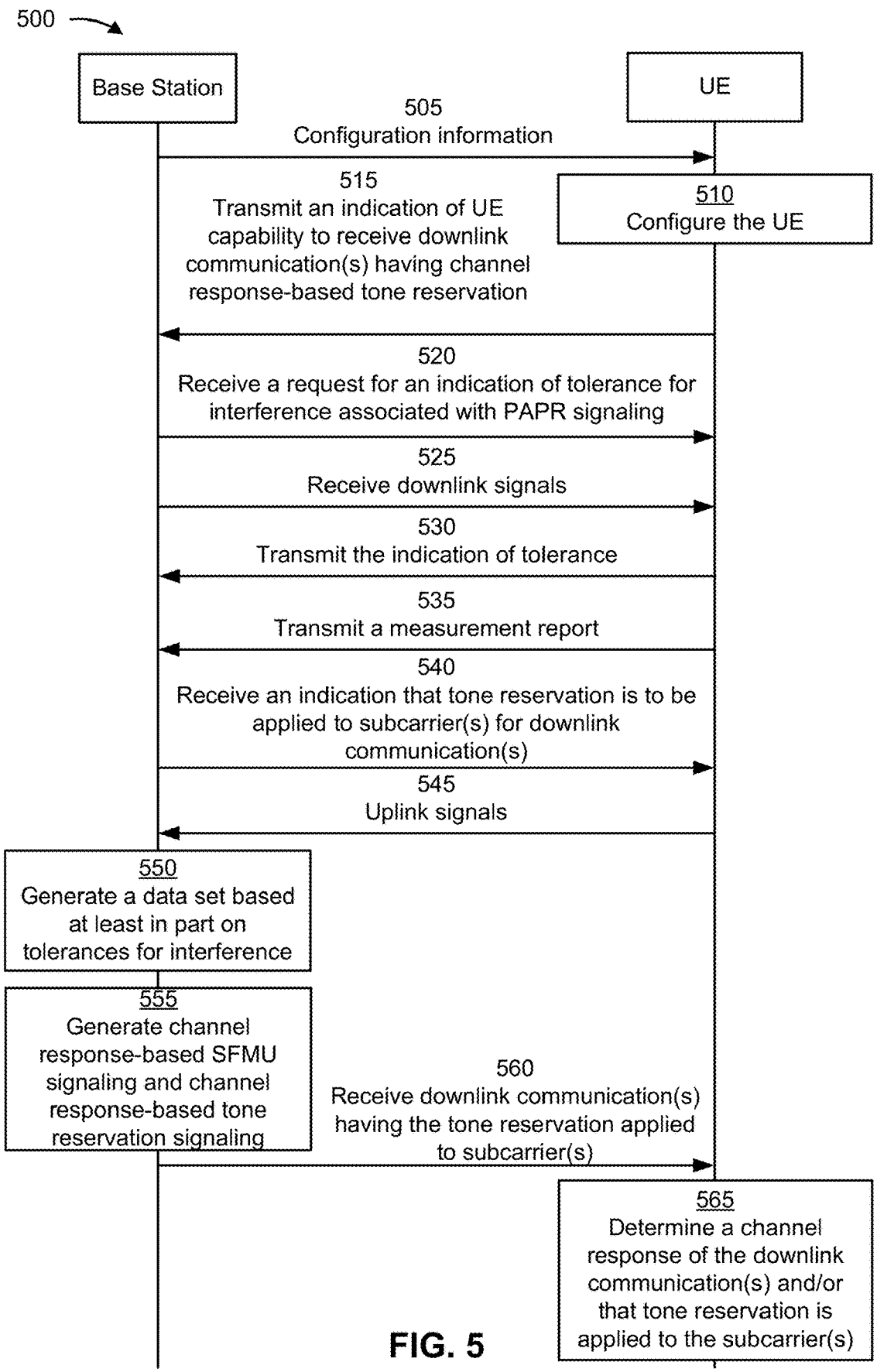
FIGS. 5 and 6 are diagrams illustrating examples associated with space frequency multi-user signaling and tone reservation signaling, in accordance with the present disclosure.

FIG. 5 is a diagram illustrating an example 500 associated with subcarrier tone reservation, in accordance with the present disclosure. As shown in FIG. 5, a base station (e.g., base station 110) may communicate with a UE (e.g., UE 120). In some aspects, the base station and the UE may be part of a wireless network (e.g., wireless network 100). As shown in FIG. 5, the base station may apply tone reservation for downlink communications.

As show by reference number 505, the base station may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of support to receive downlink communications having channel response-based tone reservation applied. In some aspects, the configuration information may indicate that the UE is to transmit an indication of a tolerance for interference associated with PAPR signaling (e.g., SFMU signaling and/or channel-response based tone reservation signaling). In some aspects, the configuration information may indicate that the UE is to receive an indication that tone reservation is to be applied to one or more subcarriers for one or more downlink communications. For example, the configuration information may indicate that the UE is to receive the indication via RRC signaling, MAC signaling, and/or DCI, among other examples. In some aspects, the indication may include an indication of a number of subcarriers to which tone reservation is to be applied, a fraction of subcarriers to which tone reservation is to be applied, and/or a threshold power for subcarriers to which tone reservation is to be applied. In some aspects, the configuration information may indicate that the UE is to transmit one or more uplink signals (e.g., sounding reference signals), using the one or more subcarriers, for measurement by the base station. In some aspects, the configuration information may indicate that the UE is to determine a channel response of the one or more downlink communications (e.g., based at least on part on demodulation reference signals of the one or more downlink communications) and determine that tone reservation is applied to the one or more subcarriers based at least in part on received energy (e.g., power) on the one or more subcarriers (e.g., based at least in part on the one or more subcarriers having a lowest received energy of subcarriers of the one or more downlink communications).

In some aspects, the configuration information may indicate that the UE is to receive the one or more downlink communications having the tone reservation applied to the one or more subcarriers, and that the one or more subcarriers have had tone reservation applied based at least in part on the measurement (e.g., by the base station) of the one or more uplink signals on the one or more subcarriers. In some aspects, the configuration information may indicate that the UE is to decode the one or more downlink communications based at least in part on discarding samples measured on the one or more subcarriers (e.g., zeroing out log likelihood ratios (LLRs) for the one or more subcarriers). In some aspects, the configuration information may indicate that the UE is to transmit an indication of a measurement of one or more signal-to-interference-plus-noise ratios (SINRs) based at least in part on reception of one or more downlink reference signals.

As shown by reference number 510, the UE may configure itself based at least in part on the configuration information. In some aspects, the UE may be configured to perform one or more operations described herein based at least in part on the configuration information.

As shown by reference number 515, the UE may transmit, and the base station may receive, an indication of a UE capability to receive downlink communications having channel response-based tone reservation. The channel response-based tone reservation signaling may be applied based at least in part on the base station transmitting tone reservation signaling on one or more subcarriers selected based at least in part on energies and/or capacities of the one or more subcarriers relative to other subcarriers of the downlink communications. In some aspects, the one or more subcarriers may be selected based at least in part on one or more measurements of uplink signals. In some aspects, the UE may transmit the indication of the UE capability as part of an RRC configuration process. For example, the UE may transmit the indication in connection with a UE capability report during or after an RRC configuration process. In some aspects, the UE capability to receive the downlink communications having the tone reservation applied may be based at least in part on a configuration of the UE, components of the UE, and/or availability of resources of the UE that may be used to determine subchannels to which tone reservation has been applied within a threshold amount of time.

As shown by reference number 520, the UE may receive a request for an indication of tolerance for interference associated with PAPR signaling. In some aspects, the base station may indicate a format for reporting the indication of tolerance for interference. For example, the base station may indicate resources for reporting the indication of tolerance for interference and/or a granularity for reporting the indication of tolerance for interference (e.g., a whole allocation, per resource block or set of resource blocks, or per subband, among other examples).

As shown by reference number 525, the base station may transmit, and the UE may receive, downlink signals, such as one or more downlink reference signals. In some aspects, the base station may transmit one or more channel state information reference signals (CSI-RSs) and/or one or more synchronization signal blocks (SSBs), among other examples, for the UE to measure. The UE may measure the one or more downlink signals to determine one or more SINRs associated with one or more channels via which the UE receives communications from the base station.

As shown by reference number 530, the UE may transmit the indication of tolerance. In some aspects, the UE may indicate a tolerance for interference for a full bandwidth of a resource allocation, a tolerance for interference for a set of one or more subbands, a tolerance for interference for a set of one or more resource blocks, and/or a tolerance for interference for a set of one or more data subcarriers, among other examples. In some aspects, the UE may report a tolerance for a distortion signal via a PUSCH, an RRC message, and/or in a channel state feedback (CSF) report, among other examples.

In some aspects, the tolerance for interference may be based at least in part on measurements of the downlink signals. For example, the tolerance for interference may be based at least in part on channel conditions of a downlink channel associated with the downlink communication and/or an SINR associated with the downlink channel associated with the downlink communication, among other examples.

In some aspects, the indication of tolerance may include an indication of a candidate tolerance of a set of candidate tolerances. For example, the set of candidate tolerances may be configured by the base station or may be indicated in a communication protocol, among other examples. In some aspects, the UE may indicate the tolerance based at least in part on an indication of the tolerance relative to an energy of signaling of the communication. For example, the indication of the tolerance relative to the energy of signaling of the communication may include a percentage of the energy of signaling of the communication or a difference from the energy of signaling of the communication.

As shown by reference number 535, the UE may transmit, and the base station may receive, a measurement report. In some aspects, the UE may transmit, and the base station may receive, a measurement of one or more SINRs that are based at least in part on reception of the one or more downlink signals. In some aspects, the base station may determine whether to use tone reservation for subsequent downlink communications based at least in part on the measurement report. For example, the base station may determine to use tone reservation based at least in part on a relatively low SINR (e.g., less than or equal to a threshold) and/or may determine to not use tone reservation based at least in part on a relatively high SINR (e.g., greater than or equal to a threshold). In some aspects, the base station may determine an amount (e.g., a level or a degree) of tone reservation to apply based at least in part on the measurement report. For example, the base station may determine a number of subcarriers to which tone reservation is to be applied, a fraction of subcarriers to which tone reservation is to be applied, or a threshold power for subcarriers to which tone reservation is to be applied based at least in part on the one or more SINRs indicated in the measurement report.

As shown by reference number 540, the base station may transmit, and the UE may receive, an indication that tone reservation is to be applied to one or more subcarriers for downlink one or more communications. In some aspects, the UE may receive the indication (e.g., MAC CE with a slot offset between a downlink allocation and corresponding data (K0) greater than or equal to 0) via RRC signaling, MAC signaling, and/or DCI, among other examples.

In some aspects, the indication that tone reservation is to be applied may include an indication of a number of subcarriers to which tone reservation is to be applied, a fraction (e.g., percentage) of subcarriers to which tone reservation is to be applied, and/or a threshold power for subcarriers to which tone reservation is to be applied, among other examples. For example, the indication may include information that indicates that the N subcarriers with the lowest energy and/or power (e.g., based on signal-to-noise ratio (SNR) measurements, SINR measurements, and/or RSSI measurements) are to have tone reservation applied, where N is a positive integer. As another example, the indication may include information that indicates a fraction or percentage (e.g., one fourth, one tenth, 5%, 10%, 20%, or the like) of subcarriers to which tone reservation is to be applied (e.g., subcarriers in the bottom fourth, tenth, 5%, 10%, 20%, or the like, in energy and/or power). As yet another example, the indication may include information that indicates a threshold power (e.g., 0 dB, −5 dB, −10 dB, or the like), and that tone reservation is to be applied to subcarriers associated with uplink signals that fail to satisfy the threshold power.

In some aspects, the indication that tone reservation is to be applied may include information identifying a tone reservation optimization technique or formula. For example, based at least in part on the number of subcarriers, the fraction of subcarriers, and/or the threshold power for subcarriers to which tone reservation is to be applied, an optimization technique may be designed to identify subcarriers for tone reservation in a manner that optimizes PAPR with a constraint of a maximum power (e.g., transmit power) that is equal to the power used for the PDSCH and/or PUCCH subcarrier. In some aspects, the indication may include information that indicates that tone reservation optimization techniques are to be performed in iterations, are to be generated by applying machine learning, are to be generated using constrained or unconstrained optimization, or are to be generated by testing hypothesis iterations, among other examples. In some aspects, the indication may include information identifying a minimum tone reservation power constraint to be used (e.g., in a manner designed to improve UE detection).

In some aspects, the indication that tone reservation is to be applied may include information identifying a PAPR threshold to be achieved by tone reservation, and may include information indicating that various tone reservation and/or optimization techniques are to be used until the PAPR threshold is satisfied. For example, the indication may include information identifying the PAPR threshold and information indicating that the lowest energy subcarriers are to be iteratively discarded until the PAPR threshold is reached (e.g., starting with discarding the lowest 1% of subcarriers and incrementing by +1% until the PAPR threshold is satisfied).

As shown by reference number 545, the UE may transmit, and the base station may receive, one or more uplink signals. In some aspects, the one or more uplink signals may be transmitted by the UE for measurement by the base station (e.g., to enable the base station to identify subcarriers to which tone reservation is to be applied). In some aspects, the one or more uplink signals include one or more sounding reference signals (SRSs).

As shown by reference number 550, the base station may generate a data set based at least in part on tolerances for interference. For example, the base station may generate a 2-dimentional map that indicates spatial, time, and/or frequency domains of communication resources on which PAPR signaling (e.g., tone reservation signaling and/or SFMU signaling) may be applied and a power level that may be used to transmit the PAPR signaling without significantly degrading UE performance (e.g., by increasing error rates). The base station may generate the data set based at least in part on knowledge of downlink channels (e.g., based at least in part on measuring uplink signals and/or receiving measurement reports) tolerances for interference as indicated by multiple UEs and/or via multiple serving beams. For example, the base station may determine energies of tone reservation signaling (e.g., for individual subcarriers or sets of subcarriers) that may be transmitted via (e.g., applied to) one or more subcarriers to have tone reservation signaling based at least in part on the tolerated distortions and knowledge of the channel.

As shown by reference number 555, the base station may generate channel response-based SFMU signaling and channel response-based tone reservation signaling based at least in part on the indications of tolerance for interference associated with PAPR signaling and based at least in part on channel knowledge of downlink channels. In some aspects, the base station may generate a PAPR signal that reduces power back off and increases power efficiencies of power amplifiers of the base station. The base station may determine one or more communication resources on which the PAPR signal is to be applied (e.g., transmit by the base station) based at least in part on the indications of tolerance for interference associated with PAPR signaling and based at least in part on channel knowledge. For example, the base station may configure energies of tone reservation signaling (e.g., for individual subcarriers or sets of subcarriers) that may be transmitted via one or more subcarriers to have tone reservation signaling based at least in part on the tolerated distortions and knowledge of the channel.

In some aspects, generating the channel response-based SFMU signaling and the channel response-based tone reservation signaling based at least in part on the one or more indications of tolerance for interference and PAPR reduction of the one or more downlink communications and/or performance losses of the one or more UEs (e.g., based at least in part on increased noise caused by the SFMU signaling and the tone reservation signaling). In some aspects, the base station may generate the channel response-based SFMU signaling and the channel response-based tone reservation signaling further based at least in part on a machine learning model, a constraint optimization, and/or iteratively testing hypotheses, among other examples.

In some aspects, the base station may apply tone reservation to one or more subcarriers based at least in part on received energy on the one or more uplink signals. In some aspects, the base station may determine channel conditions (e.g., received energy measurements, SINR value(s), and/or PAPR value(s), among other examples) based at least in part on the one or more uplink signals and apply tone reservation based at least in part on the channel conditions. In some aspects, the base station may apply tone reservation to the one or more subcarriers based at least in part on the one or more subcarriers having a lowest received energy of subcarriers of the one or more uplink signals. In some aspects, the base station may apply tone reservation based at least in part on receiving the indication of the measurement of one or more SINRs (e.g., the measurement report described in connection with reference number 525) and/or based at least in part on transmission of one or more downlink reference signals (e.g., the downlink signals described in connection with reference number 520).

In some aspects, the base station may apply tone reservation to a number of subcarriers, a fraction (e.g., percentage) of subcarriers, and/or based at least in part on a threshold power for subcarriers, among other examples (e.g., as described herein). In some aspects, the base station may apply tone reservation using a tone reservation optimization technique (e.g., as described herein). In some aspects, the base station may apply tone reservation based at least in part on a PAPR threshold and/or various tone reservation and/or optimization techniques to be iteratively used until the PAPR threshold is satisfied (e.g., as described herein).

In some aspects, the base station may prepare a UE report indicating whether tone reservation is applied and indicating a number of one or more subcarriers (e.g., a fraction or percentage) to which tone reservation is applied. In some aspects, the tone reservation frequency locations (e.g., subcarrier identifiers) and corresponding values may be identified to a mapper, along with data and/or pilots for transmission to the UE (e.g., using an OFDM transmission protocol (e.g., inverse fast Fourier transform (IFFT))). The mapper may map the data and/or pilots to subcarriers of the channel, excluding subcarriers to which tone reservation is applied.

As shown by reference number 560, the base station may transmit, and the UE may receive, one or more downlink communications having the tone reservation applied to one or more subcarriers. In some aspects, the one or more subcarriers to which tone reservation is applied (e.g., by the base station) are based at least in part on the measurement of the one or more uplink signals on the one or more subcarriers (e.g., as described herein).

As shown by reference number 565, the UE may determine a channel response of the one or more downlink communications and/or that tone reservation is applied to the one or more subcarriers based at least in part on received energy on the one or more subcarriers. In some aspects, the UE may determine that tone reservation is applied to the one or more downlink communications based at least in part on the configuration information (e.g., described above in connection with reference number 505), the indication that tone reservation is to be applied (e.g., described above in connection with reference number 530), and/or a UE report included in the downlink one or more communications (e.g., described above in connection with reference number 535), among other examples. In some aspects, the UE may determine the channel response based at least in part on DMRSs of the one or more downlink communications (e.g., based at least in part on an estimation of the lowest energy subcarriers using the DMRSs).

In some aspects, the UE may determine that tone reservation is applied to the one or more subcarriers based at least in part on the one or more subcarriers having a lowest received energy of subcarriers used for the one or more downlink communications. In some aspects, the UE may determine that tone reservation is applied to the one or more subcarriers based at least in part on information included in the indication that tone reservation is to be applied to the one or more subcarriers (e.g., described above in connection with reference number 540).

The UE may decode the one or more downlink communications. In some aspects, the UE may use information included in the indication that tone reservation is to be applied to the one or more subcarriers (e.g., described above in connection with reference number 540) to decode the downlink one or more communications. In some aspects, the UE may decode the downlink one or more communications based at least in part on discarding signals associated with the one or more subcarriers to which tone reservation was applied (e.g., zeroing out LLRs of samples associated with the one or more subcarriers).

As indicated above, FIG. 5 is provided as an example. Other examples may differ from what is described with respect to FIG. 5.

Figure 6:
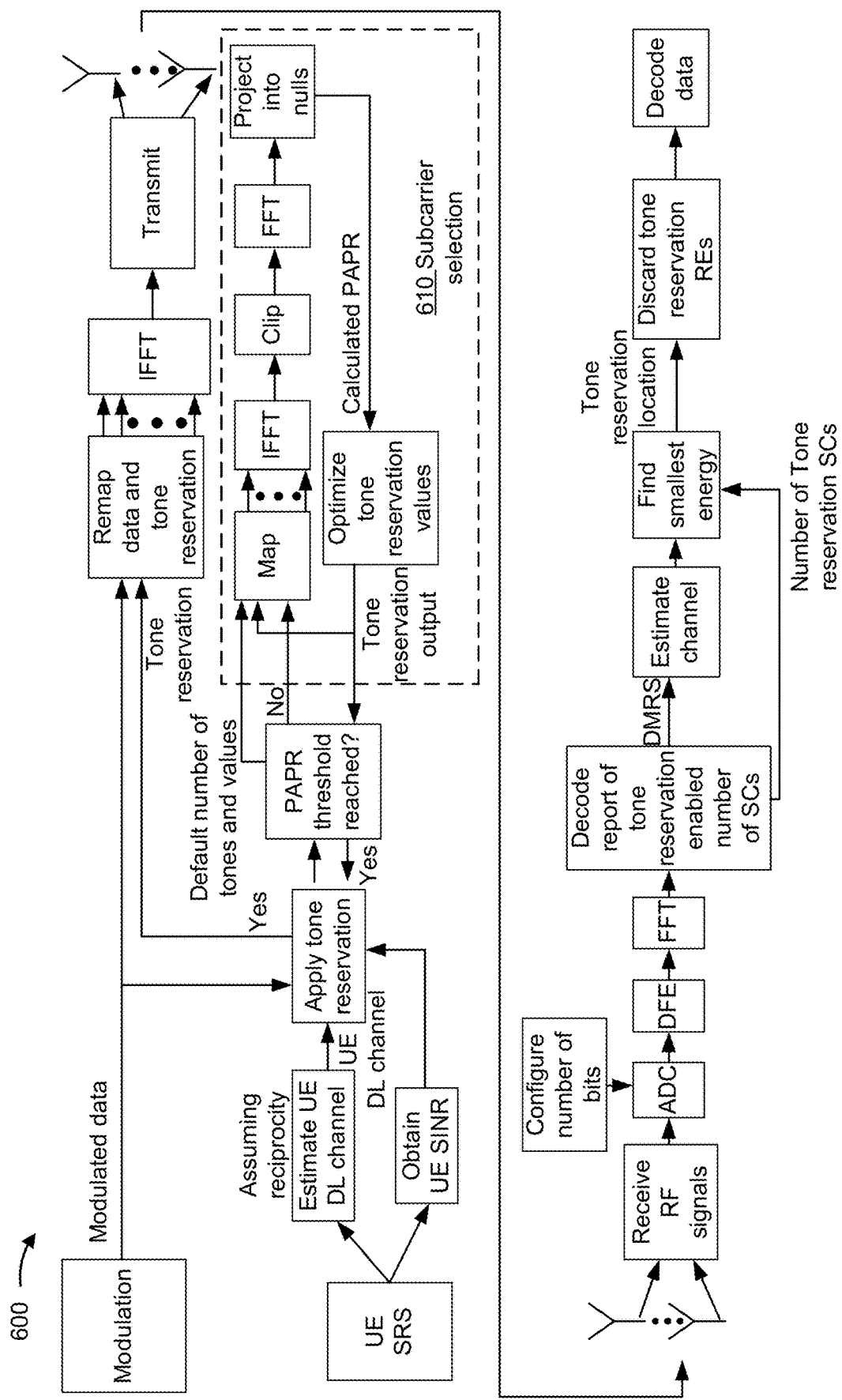

FIG. 6 is a diagram illustrating an example 600 of subcarrier tone reservation, in accordance with the present disclosure. As shown in FIG. 6, tone reservation may be applied to communications transmitted from a base station to a UE.

As shown in example 600, the base station may measure one or more UE SRSs to estimate an uplink channel. The base station may use the estimate of the uplink channel to estimate a downlink channel (e.g., using an assumption of reciprocity between the uplink channel and the downlink channel). In some aspects, the base station may use the estimate of the downlink channel to determine subcarriers to which tone reservation is to be applied.

The base station may determine that tone reservation is to be applied to one or more subcarriers for downlink transmissions to the UE (e.g., based at least in part on an SINR reported by the UE, the uplink channel estimate, other metrics associated with the uplink channel or the downlink channel, network traffic, and/or an amount of data buffered for transmission to the UE). When the base station determines that tone reservation is to be applied, the base station may then determine which subcarriers are to be selected for tone reservation. In some aspects, selection of subcarriers may be based at least in part on a default number, such as the lowest 10% of subcarriers. In some aspects, selection of the default number may be based at least in part on the SINR measurements.

As shown by reference number 610, in some aspects, the base station may iteratively perform subcarrier selection techniques until a threshold PAPR value is reached. For example, the base station may use the UE downlink channel estimate, a default number of tones (e.g., subcarriers), and a default PAPR threshold to perform a selective mapping (SLM) technique, where alternative transmit sequence vectors (e.g., corresponding to the UE downlink channel) are generated from the same data source by multiplying the vectors by a random or pseudo-random phase. After multiplication, IFFT may be performed on the vectors to convert the corresponding signal from the frequency domain to the time domain, the signaling may be clipped and fast Fourier transform (FFT) may be applied to project PAPR signaling into a nulls including null-space (e.g., using SFMU signaling) and frequency nulls (e.g., using tone reservation signaling). The PAPR signaling may be projected onto orthogonal sub-spaces of served beams and on use-spaces with tolerated distortions. The PAPR signaling may be further projected to a frequency domain based at least in part on indications of tolerated distortions and channel knowledge (e.g., an estimation of the channel and/or a channel response). For example, the base station may determine an energy of the tone reservation signaling for one or more subcarriers (e.g., each subcarrier) to have tone reservation signaling based at least in part on the tolerated distortions and knowledge of the channel. PAPR values may be determined for each of the projections. The PAPR values may be compared to one another in a manner designed to optimize tone reservation values by identifying a vector having tone reservations that result in a relatively low, or lowest, PAPR value with respect to other vectors. The base station may then determine whether the PAPR threshold is satisfied by the tone reservations indicated in the identified vector.

In some aspects, the subcarrier selection process may be performed up to k iterations, where k is a positive integer, and/or until a PAPR value that satisfies the threshold is reached. For example, if a default value (e.g., an initial value) for the number of subcarriers to which tone reservation is to be applied is 5, and the subcarrier selection output fails to satisfy the PAPR threshold by applying tone reservation to the lowest 5% of subcarriers, the base station may increase the default value (e.g., by a fixed amount, variable amount, or fixed rate) and perform SLM again to determine if reserving the increased number of subcarriers (e.g., the lowest 6%) will satisfy the PAPR threshold. In some aspects, the PAPR threshold may be modified (e.g., lowered to decrease the number of subcarriers that would be reserved, or raised to increase the number of subcarriers that would be reserved) when iterating through the subcarrier selection process.

Once a tone reservation satisfying the PAPR threshold is identified, the base station may use the identified tone reservation and modulated data to remap the modulated data using the identified tone reservation scheme (e.g., application of tone reservation on the identified subchannels). For example, in a situation where the subcarrier selection process indicates that the lowest 6% of subcarriers (e.g., in terms of SINR) should be reserved to meet a given PAPR threshold, the modulated data may only be mapped to the top 94% of subcarriers (e.g., based on received energy and/or power), leaving the bottom 6% reserved. After application of IFFT, the resulting downlink communication may be transmitted to the UE.

The UE may receive the downlink communication as radio frequency (RF) signals, and may use analog to digital conversion (ADC), using a configured number of bits, to provide digital output to a digital front end (DFE) of the UE. The UE may then apply an FFT algorithm to convert the received signals to a frequency domain and obtain the UE downlink communication (e.g., DMRSs).

The UE may decode a report of the tone reservation (e.g., included in DCI), which may indicate a number of subcarriers to which tone reservation was applied. For example, the report may indicate that tone reservation is to be applied to the lowest 6% of subcarriers.

The UE may use the downlink communication (e.g., DMRS) to estimate the energy (e.g., power) of the subcarriers of the channel (e.g., using SINR). After identifying the smallest (e.g., lowest) energy subcarriers (e.g., the bottom 6%), the UE may discard the identified subcarriers and decode the remaining 94% of the data.

In this way, the base station and UE may communicate using tone reservation without the need to transmit reports to identify specific subcarriers to which tone reservation is to be applied. This may reduce overhead associated with the use of tone reservation by obviating the need to transmit reports for tone reservation, which may increase throughput between the UE and base station. In addition, the application of tone reservation may lead to improved PAPR, which may conserve resources that the UE uses to receive (e.g., demodulate, decode, and/or the like) the downlink transmission and may also lead to improved efficiency of power amplification at the base station (e.g., by conserving power that would otherwise be used to transmit reserved subcarriers).

As indicated above, FIG. 6 is provided as an example. Other examples may differ from what is described with respect to FIG. 6.

Figure 7:
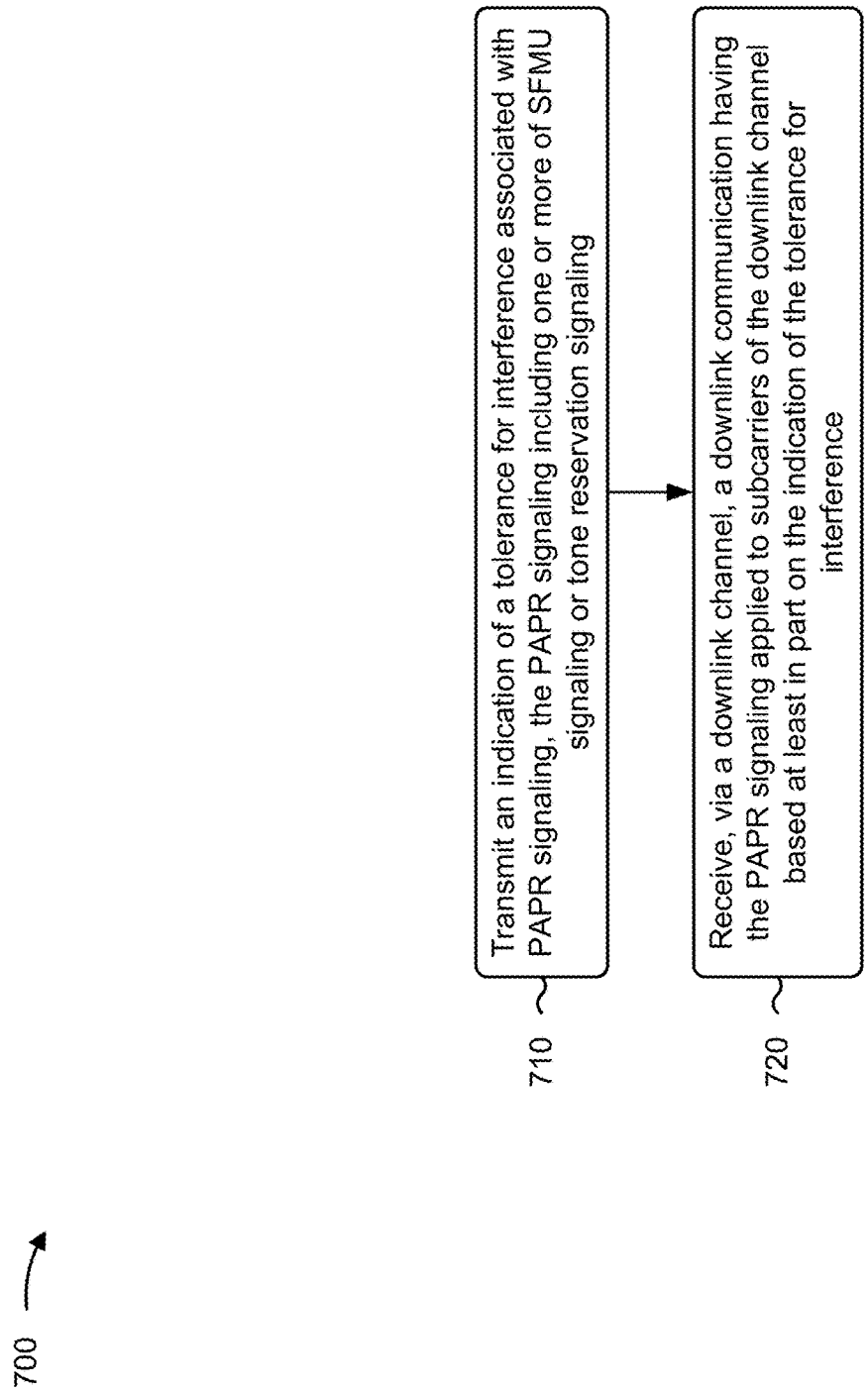
FIGS. 7 and 8 are diagrams illustrating example processes associated with space frequency multi-user signaling and tone reservation signaling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with space frequency multi-user signaling and tone reservation signaling.

As shown in FIG. 7, in some aspects, process 700 may include transmitting an indication of a tolerance for interference associated with PAPR signaling, the PAPR signaling including one or more of SFMU signaling or tone reservation signaling (block 710). For example, the UE (e.g., using communication manager 140 and/or transmission component 904, depicted in FIG. 9) may transmit an indication of a tolerance for interference associated with PAPR signaling, the PAPR signaling including one or more of SFMU signaling or tone reservation signaling, as described above.

As further shown in FIG. 7, in some aspects, process 700 may include receiving, via a downlink channel, a downlink communication having the PAPR signaling applied to subcarriers of the downlink channel based at least in part on the indication of the tolerance for interference (block 720). For example, the UE (e.g., using communication manager 140 and/or reception component 902, depicted in FIG. 9) may receive, via a downlink channel, a downlink communication having the PAPR signaling applied to subcarriers of the downlink channel based at least in part on the indication of the tolerance for interference, as described above.

Process 700 may include additional aspects, such as any single aspect or any combination of aspects described below and/or in connection with one or more other processes described elsewhere herein.

In a first aspect, the indication of the tolerance for interference on data subcarriers associated with a downlink communication includes an indication of one or more of a tolerance for interference for a full bandwidth of a resource allocation, a tolerance for interference for a set of one or more subbands, a tolerance for interference for a set of one or more resource blocks, or a tolerance for interference for a set of one or more data subcarriers.

In a second aspect, alone or in combination with the first aspect, the tolerance for interference is based at least in part on one or more of channeling conditions of a downlink channel associated with the downlink communication, or an SINR associated with the downlink channel associated with the downlink communication.

In a third aspect, alone or in combination with one or more of the first and second aspects, receiving the downlink communication comprises receiving data on a first set of subcarriers, and receiving one or more of channel response-based SFMU PAPR signaling or channel response-based tone reservation signaling on a second set of subcarriers that does not include subcarriers of the first set of subcarriers.

In a fourth aspect, alone or in combination with one or more of the first through third aspects, receiving the downlink communication comprises receiving data on a first set of subcarriers, and receiving one or more of channel response-based SFMU PAPR signaling or channel response-based tone reservation signaling on a second set of subcarriers that includes one or more subcarriers of the first set of subcarriers.

In a fifth aspect, alone or in combination with one or more of the first through fourth aspects, process 700 includes receiving a request for the indication of the tolerance for interference associated with the downlink channel.

In a sixth aspect, alone or in combination with one or more of the first through fifth aspects, process 700 includes receiving an indication that channel response-based tone reservation is to be applied to one or more subcarriers of the downlink channel.

In a seventh aspect, alone or in combination with one or more of the first through sixth aspects, process 700 includes receiving an indication of one or more of a number of subcarriers to which tone reservation is to be applied, a fraction of subcarriers to which tone reservation is to be applied, or a threshold power for subcarriers to which tone reservation is to be applied.

In an eighth aspect, alone or in combination with one or more of the first through seventh aspects, receiving the downlink communication comprises estimating a channel response of the downlink channel, and estimating locations of one or more subcarriers of the downlink channel having channel response-based tone reservation applied based at least in part on received energy on the one or more subcarriers or capacity of the one or more subcarriers.

In a ninth aspect, alone or in combination with one or more of the first through eighth aspects, estimating the channel response of the downlink channel comprises estimating the channel response based at least in part on one or more of DMRS symbols of the downlink communication, or data symbols of the downlink communication.

In a tenth aspect, alone or in combination with one or more of the first through ninth aspects, process 700 includes zeroing out LLRs associated with the one or more subcarriers, or omitting the one or more subcarriers from demodulation and decoding operations.

In an eleventh aspect, alone or in combination with one or more of the first through tenth aspects, process 700 includes transmitting one or more uplink signals for a base station to estimate a channel response of the downlink channel, or a report of the channel response of the downlink channel.

In a twelfth aspect, alone or in combination with one or more of the first through eleventh aspects, the indication of the tolerance for interference comprises one or more of an indication of a candidate tolerance of a set of candidate tolerances, or an indication of the tolerance relative to an energy of signaling of the communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
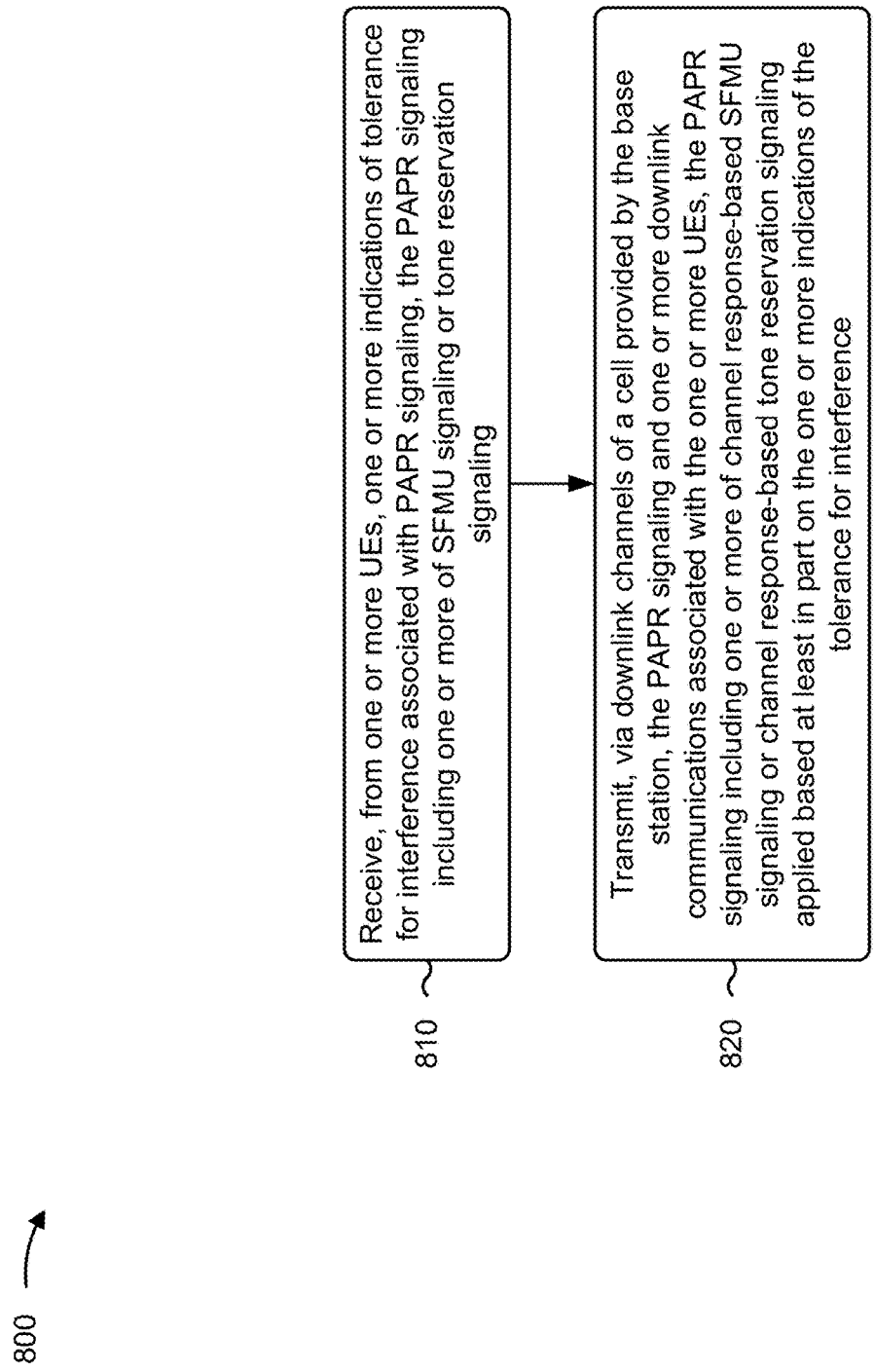

FIG. 8 is a diagram illustrating an example process 800 performed, for example, by a base station, in accordance with the present disclosure. Example process 800 is an example where the base station (e.g., base station 110) performs operations associated with space frequency multi-user signaling and tone reservation signaling.

As shown in FIG. 8, in some aspects, process 800 may include receiving, from one or more UEs, one or more indications of tolerance for interference associated with PAPR signaling, the PAPR signaling including one or more of SFMU signaling or tone reservation signaling (block 810). For example, the base station (e.g., using communication manager 150 and/or reception component 1002, depicted in FIG. 10) may receive, from one or more UEs, one or more indications of tolerance for interference associated with PAPR signaling, the PAPR signaling including one or more of SFMU signaling or tone reservation signaling, as described above.

As further shown in FIG. 8, in some aspects, process 800 may include transmitting, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference (block 820). For example, the base station (e.g., using communication manager 150 and/or transmission component 1004, depicted in FIG. 10) may transmit, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference, as described above.

Process 800 may include additional aspects, such as any single aspect or any combination of aspects described below and/or in connection with one or more other processes described elsewhere herein.

In a first aspect, process 800 includes generating, based at least in part the one or more indications of tolerance for interference, a data set that indicates tolerances for interference for multiple spatial portions of the cell provided by the base station.

In a second aspect, alone or in combination with the first aspect, the data set further indicates the tolerances for interference at one or more subcarriers for the multiple spatial portions of the cell provided by the base station.

In a third aspect, alone or in combination with one or more of the first and second aspects, process 800 includes receiving, from the one or more UEs, uplink reference signals, and generating, based at least in part on the uplink reference signals, a data set that indicates tolerances for interference at one or more subcarriers for multiple spatial portions of the cell provided by the base station.

In a fourth aspect, alone or in combination with one or more of the first through third aspects, transmitting the PAPR signaling comprises transmitting the channel response-based SFMU signaling and channel response-based tone reservation signaling based at least in part on the one or more indications of tolerance for interference.

In a fifth aspect, alone or in combination with one or more of the first through fourth aspects, process 800 includes generating the channel response-based SFMU signaling and the channel response-based tone reservation signaling based at least in part on the one or more indications of tolerance for interference and one or more of PAPR reduction of the one or more downlink communications, or performance losses of the one or more UEs.

In a sixth aspect, alone or in combination with one or more of the first through fifth aspects, generating the channel response-based SFMU signaling and the channel response-based tone reservation signaling is further based at least in part on one or more of a machine learning model, a constraint optimization, or iteratively testing hypotheses.

In a seventh aspect, alone or in combination with one or more of the first through sixth aspects, process 800 includes transmitting, to the one or more UEs, requests for the one or more indications of the tolerance for interference associated with the downlink channels.

In an eighth aspect, alone or in combination with one or more of the first through seventh aspects, process 800 includes transmitting, to the one or more UEs, indications that channel response-based tone reservation is to be applied to one or more subcarriers of the downlink channels.

In a ninth aspect, alone or in combination with one or more of the first through eighth aspects, process 800 includes transmitting, to the one or more UEs, indications of one or more of a number of subcarriers to which tone reservation is to be applied, a fraction of subcarriers to which tone reservation is to be applied, or a threshold power for subcarriers to which tone reservation is to be applied.

In a tenth aspect, alone or in combination with one or more of the first through ninth aspects, process 800 includes estimating channel responses of the downlink channels, and applying the tone reservation signaling to one or more subcarriers of one or more of the downlink channels based at least in part on expected received energies on the one or more subcarriers or capacity of the one or more subcarriers.

In an eleventh aspect, alone or in combination with one or more of the first through tenth aspects, estimating the channel response of the downlink channels comprises estimating the channel responses based at least in part on one or more of uplink reference signals, or one or more reports of channel responses of the downlink channels.

In a twelfth aspect, alone or in combination with one or more of the first through eleventh aspects, process 800 includes transmitting an indication of whether subcarriers having the tone reservation signaling are to have LLRs zeroed out or omitted from demodulation and decoding operations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
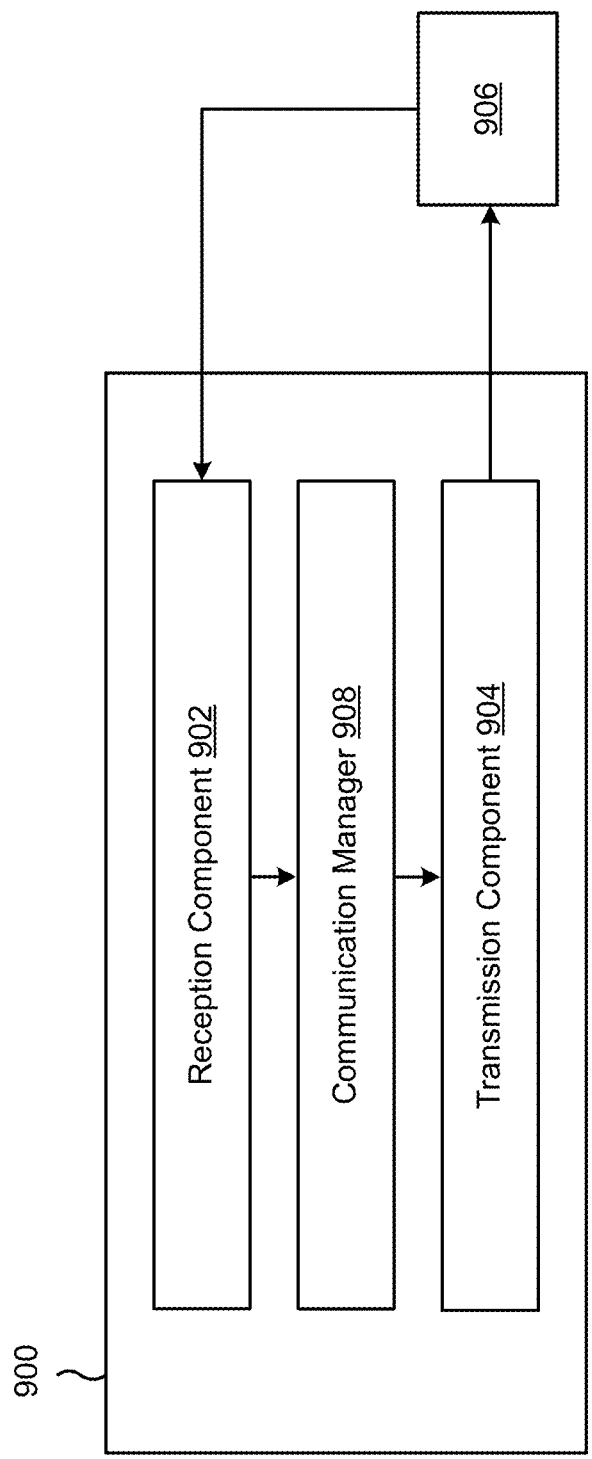
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager (e.g., the communication manager 140).

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit an indication of a tolerance for interference associated with PAPR signaling, the PAPR signaling including one or more of SFMU signaling or tone reservation signaling. The reception component 902 may receive, via a downlink channel, a downlink communication having the PAPR signaling applied to subcarriers of the downlink channel based at least in part on the indication of the tolerance for interference.

The reception component 902 may receive a request for the indication of the tolerance for interference associated with the downlink channel.

The reception component 902 may receive an indication that channel response-based tone reservation is to be applied to one or more subcarriers of the downlink channel.

The reception component 902 may receive an indication of one or more of a number of subcarriers to which tone reservation is to be applied, a fraction of subcarriers to which tone reservation is to be applied, or a threshold power for subcarriers to which tone reservation is to be applied.

The communication manager 908 may zero out LLRs associated with the one or more subcarriers.

The communication manager 908 may omit the one or more subcarriers from demodulation and decoding operations.

The transmission component 904 may transmit one or more of uplink signals for a base station to estimate a channel response of the downlink channel, or a report of the channel response of the downlink channel.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
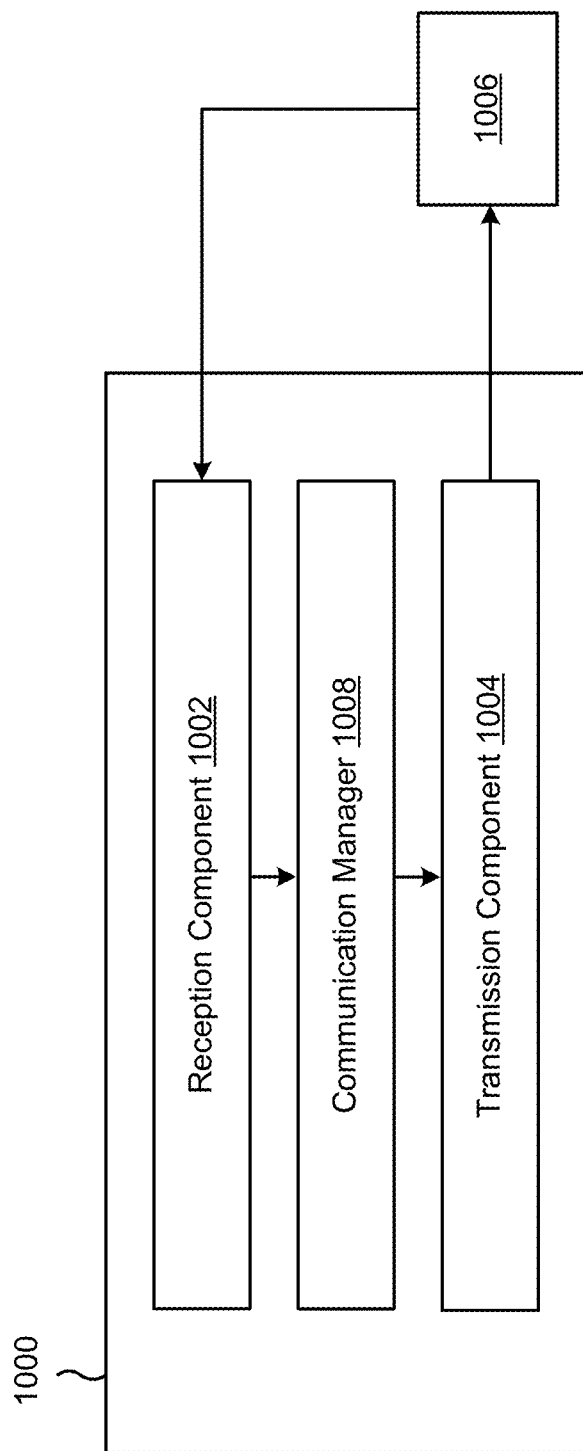

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager (e.g., the communication manager 150).

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive, from one or more UEs, one or more indications of tolerance for interference associated with PAPR signaling, the PAPR signaling including one or more of SFMU signaling or tone reservation signaling. The transmission component 1004 may transmit, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

The communication manager 1008 may generate, based at least in part the one or more indications of tolerance for interference, a data set that indicates tolerances for interference for multiple spatial portions of the cell provided by the base station.

The reception component 1002 may receive, from the one or more UEs, uplink reference signals.

The communication manager 1008 may generate, based at least in part on the uplink reference signals, a data set that indicates tolerances for interference at one or more subcarriers for multiple spatial portions of the cell provided by the base station.

The communication manager 1008 may generate the channel response-based SFMU signaling and the channel response-based tone reservation signaling based at least in part on the one or more indications of tolerance for interference and one or more of PAPR reduction of the one or more downlink communications, or performance losses of the one or more UEs.

The transmission component 1004 may transmit, to the one or more UEs, requests for the one or more indications of the tolerance for interference associated with the downlink channels.

The transmission component 1004 may transmit, to the one or more UEs, indications that channel response-based tone reservation is to be applied to one or more subcarriers of the downlink channels.

The transmission component 1004 may transmit, to the one or more UEs, indications of one or more of a number of subcarriers to which tone reservation is to be applied, a fraction of subcarriers to which tone reservation is to be applied, or a threshold power for subcarriers to which tone reservation is to be applied.

The communication manager 1008 may estimate channel responses of the downlink channels.

The communication manager 1008 may apply the tone reservation signaling to one or more subcarriers of one or more of the downlink channels based at least in part on expected received energies on the one or more subcarriers or capacity of the one or more subcarriers.

The transmission component 1004 may transmit an indication of whether subcarriers having the tone reservation signaling are to have LLRs zeroed out or omitted from demodulation and decoding operations.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting an indication of a tolerance for interference associated with peak-to-average-power-ratio (PAPR) signaling, the PAPR signaling including one or more of space frequency multi-user (SFMU) signaling or tone reservation signaling; and receiving, via a downlink channel, a downlink communication having the PAPR signaling applied to subcarriers of the downlink channel based at least in part on the indication of the tolerance for interference.

Aspect 2: The method of Aspect 1, wherein the indication of the tolerance for interference on data subcarriers associated with a downlink communication includes an indication of one or more of: a tolerance for interference for a full bandwidth of a resource allocation, a tolerance for interference for a set of one or more subbands, a tolerance for interference for a set of one or more resource blocks, or a tolerance for interference for a set of one or more data subcarriers.

Aspect 3: The method of any of Aspects 1-2, wherein the tolerance for interference is based at least in part on one or more of: channel conditions of a downlink channel associated with the downlink communication, or a signal-to-interference-plus-noise ratio (SINR) associated with the downlink channel associated with the downlink communication.

Aspect 4: The method of any of Aspects 1-3, wherein receiving the downlink communication comprises: receiving data on a first set of subcarriers, and receiving one or more of channel response-based SFMU PAPR signaling or channel response-based tone reservation signaling on a second set of subcarriers that does not include subcarriers of the first set of subcarriers.

Aspect 5: The method of any of Aspects 1-4, wherein receiving the downlink communication comprises: receiving data on a first set of subcarriers, and receiving one or more of channel response-based SFMU PAPR signaling or channel response-based tone reservation signaling on a second set of subcarriers that includes one or more subcarriers of the first set of subcarriers.

Aspect 6: The method of any of Aspects 1-5, further comprising: receiving a request for the indication of the tolerance for interference associated with the downlink channel.

Aspect 7: The method of any of Aspects 1-6, further comprising: receiving an indication that channel response-based tone reservation is to be applied to one or more subcarriers of the downlink channel.

Aspect 8: The method of Aspect 7, further comprising receiving an indication of one or more of: a number of subcarriers to which tone reservation is to be applied, a fraction of subcarriers to which tone reservation is to be applied, or a threshold power for subcarriers to which tone reservation is to be applied.

Aspect 9: The method of any of Aspects 1-8, wherein receiving the downlink communication comprises: estimating a channel response of the downlink channel, and estimating locations of one or more subcarriers of the downlink channel having channel response-based tone reservation applied based at least in part on received energy on the one or more subcarriers or capacity of the one or more subcarriers.

Aspect 10: The method of Aspect 9, wherein estimating the channel response of the downlink channel comprises estimating the channel response based at least in part on one or more of: data modulated reference signal (DMRS) symbols of the downlink communication, or data symbols of the downlink communication.

Aspect 11: The method of Aspect 9, further comprising: zeroing out log-likelihood ratios (LLRs) associated with the one or more subcarriers, or omitting the one or more subcarriers from demodulation and decoding operations.

Aspect 12: The method of any of Aspects 1-11, further comprising transmitting one or more of: uplink signals for a base station to estimate a channel response of the downlink channel, or a report of the channel response of the downlink channel.

Aspect 13: The method of any of Aspects 1-12, wherein the indication of the tolerance for interference comprises one or more of: an indication of a candidate tolerance of a set of candidate tolerances; or an indication of the tolerance relative to an energy of signaling of the communication.

Aspect 14: A method of wireless communication performed by a base station, comprising: receiving, from one or more user equipment (UEs), one or more indications of tolerance for interference associated with peak-to-average-power-ratio (PAPR) signaling, the PAPR signaling including one or more of space frequency multi-user (SFMU) signaling or tone reservation signaling; and transmitting, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

Aspect 15: The method of Aspect 14, further comprising: generating, based at least in part the one or more indications of tolerance for interference, a data set that indicates tolerances for interference for multiple spatial portions of the cell provided by the base station.

Aspect 16: The method of Aspect 15, wherein the data set further indicates the tolerances for interference at one or more subcarriers for the multiple spatial portions of the cell provided by the base station.

Aspect 17: The method of any of Aspects 14-16, further comprising: receiving, from the one or more UEs, uplink reference signals, and generating, based at least in part on the uplink reference signals, a data set that indicates tolerances for interference at one or more subcarriers for multiple spatial portions of the cell provided by the base station.

Aspect 18: The method of any of Aspects 14-17, wherein transmitting the PAPR signaling comprises transmitting the channel response-based SFMU signaling and channel response-based tone reservation signaling based at least in part on the one or more indications of tolerance for interference.

Aspect 19: The method of Aspect 18, further comprising: generating the channel response-based SFMU signaling and the channel response-based tone reservation signaling based at least in part on the one or more indications of tolerance for interference and one or more of: PAPR reduction of the one or more downlink communications, or performance losses of the one or more UEs.

Aspect 20: The method of Aspect 19, wherein generating the channel response-based SFMU signaling and the channel response-based tone reservation signaling is further based at least in part on one or more of: a machine learning model, a constraint optimization, or iteratively testing hypotheses.

Aspect 21: The method of any of Aspects 14-20, further comprising: transmitting, to the one or more UEs, requests for the one or more indications of the tolerance for interference associated with the downlink channels.

Aspect 22: The method of any of Aspects 14-21, further comprising: transmitting, to the one or more UEs, indications that channel response-based tone reservation is to be applied to one or more subcarriers of the downlink channels.

Aspect 23: The method of Aspect 22, further comprising transmitting, to the one or more UEs, indications of one or more of: a number of subcarriers to which tone reservation is to be applied, a fraction of subcarriers to which tone reservation is to be applied, or a threshold power for subcarriers to which tone reservation is to be applied.

Aspect 24: The method of any of Aspects 14-23, further comprising: estimating channel responses of the downlink channels, and applying the tone reservation signaling to one or more subcarriers of one or more of the downlink channels based at least in part on expected received energies on the one or more subcarriers or capacity of the one or more subcarriers.

Aspect 25: The method of Aspect 24, wherein estimating the channel response of the downlink channels comprises estimating the channel responses based at least in part on one or more of: uplink reference signals, or one or more reports of channel responses of the downlink channels.

Aspect 26: The method of any of Aspects 14-25, further comprising: transmitting an indication of whether subcarriers having the tone reservation signaling are to have log-likelihood ratios (LLRs) zeroed out or omitted from demodulation and decoding operations.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   transmit an indication of a tolerance for interference associated with peak-to-average-power-ratio (PAPR) signaling, the PAPR signaling including space frequency multi-user (SFMU) signaling and tone reservation signaling; and
   receive, via a downlink channel, a downlink communication having the PAPR signaling applied to subcarriers of the downlink channel based at least in part on the indication of the tolerance for interference.

2. The UE of claim 1, wherein the indication of the tolerance for interference on data subcarriers associated with a downlink communication includes an indication of one or more of:
   a tolerance for interference for a full bandwidth of a resource allocation,
   a tolerance for interference for a set of one or more subbands,
   a tolerance for interference for a set of one or more resource blocks, or
   a tolerance for interference for a set of one or more data subcarriers.

3. The UE of claim 1, wherein the tolerance for interference is based at least in part on one or more of:
   channel conditions of a downlink channel associated with the downlink communication, or
   a signal-to-interference-plus-noise ratio (SINR) associated with the downlink channel associated with the downlink communication.

4. The UE of claim 1, wherein the one or more processors, to receive the downlink communication, are configured to:
   receive data on a first set of subcarriers, and
   receive one or more of channel response-based SFMU PAPR signaling or channel response-based tone reservation signaling on a second set of subcarriers that does not include subcarriers of the first set of subcarriers.

5. The UE of claim 1, wherein the one or more processors, to receive the downlink communication, are configured to:
   receive data on a first set of subcarriers, and
   receive one or more of channel response-based SFMU PAPR signaling or channel response-based tone reservation signaling on a second set of subcarriers that includes one or more subcarriers of the first set of subcarriers.

6. The UE of claim 1, wherein the one or more processors are further configured to:
   receive a request for the indication of the tolerance for interference associated with the downlink channel.

7. The UE of claim 1, wherein the one or more processors are further configured to:
   receive an indication that channel response-based tone reservation is to be applied to one or more subcarriers of the downlink channel.

8. The UE of claim 7, wherein the one or more processors are further configured to receive an indication of one or more of:
   a number of subcarriers to which tone reservation is to be applied,
   a fraction of subcarriers to which tone reservation is to be applied, or
   a threshold power for subcarriers to which tone reservation is to be applied.

9. The UE of claim 1, wherein the one or more processors, to receive the downlink communication, are configured to:
   estimate a channel response of the downlink channel, and
   estimate locations of one or more subcarriers of the downlink channel having channel response-based tone reservation applied based at least in part on received energy on the one or more subcarriers or capacity of the one or more subcarriers.

10. The UE of claim 9, wherein the one or more processors, to estimate the channel response of the downlink channel, are configured to estimate the channel response based at least in part on one or more of:
    data modulated reference signal (DMRS) symbols of the downlink communication, or
    data symbols of the downlink communication.

11. The UE of claim 9, wherein the one or more processors are further configured to:
    zero out log-likelihood ratios (LLRs) associated with the one or more subcarriers, or
    omit the one or more subcarriers from demodulation and decoding operations.

12. The UE of claim 1, wherein the one or more processors are further configured to transmit one or more of:
    uplink signals for a base station to estimate a channel response of the downlink channel, or
    a report of the channel response of the downlink channel.

13. The UE of claim 1, wherein the indication of the tolerance for interference comprises one or more of:
  an indication of a candidate tolerance of a set of candidate tolerances, or
  an indication of the tolerance relative to an energy of signaling of the downlink communication.

14. A base station for wireless communication, comprising:
  a memory; and
  one or more processors, coupled to the memory, configured to:
    receive, from one or more user equipment (UEs), one or more indications of tolerance for interference associated with peak-to-average-power-ratio (PAPR) signaling, the PAPR signaling including space frequency multi-user (SFMU) signaling and tone reservation signaling; and
    transmit, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

15. The base station of claim 14, wherein the one or more processors are further configured to:
  generate, based at least in part the one or more indications of tolerance for interference, a data set that indicates tolerances for interference for multiple spatial portions of the cell provided by the base station.

16. The base station of claim 15, wherein the data set further indicates tolerances for interference of the one or more indications of tolerance for interference at one or more subcarriers for the multiple spatial portions of the cell provided by the base station.

17. The base station of claim 14, wherein the one or more processors are further configured to:
  receive, from the one or more UEs, uplink reference signals, and
  generate, based at least in part on the uplink reference signals, a data set that indicates tolerances for interference at one or more subcarriers for multiple spatial portions of the cell provided by the base station.

18. The base station of claim 14, wherein the one or more processors, to transmit the PAPR signaling, are configured to transmit the channel response-based SFMU signaling and channel response-based tone reservation signaling based at least in part on the one or more indications of tolerance for interference.

19. The base station of claim 18, wherein the one or more processors are further configured to:
  generate the channel response-based SFMU signaling and the channel response-based tone reservation signaling based at least in part on the one or more indications of tolerance for interference and one or more of:
    PAPR reduction of the one or more downlink communications, or
    performance losses of the one or more UEs.

20. The base station of claim 19, wherein generating the channel response-based SFMU signaling and the channel response-based tone reservation signaling is further based at least in part on one or more of:
  a machine learning model,
  a constraint optimization, or
  iteratively testing hypotheses.

21. The base station of claim 14, wherein the one or more processors are further configured to:
  transmit, to the one or more UEs, requests for the one or more indications of the tolerance for interference associated with the downlink channels.

22. The base station of claim 14, wherein the one or more processors are further configured to:
  transmit, to the one or more UEs, indications that channel response-based tone reservation is to be applied to one or more subcarriers of the downlink channels.

23. The base station of claim 22, wherein the one or more processors are further configured to transmit, to the one or more UEs, indications of one or more of:
  a number of subcarriers to which tone reservation is to be applied,
  a fraction of subcarriers to which tone reservation is to be applied, or
  a threshold power for subcarriers to which tone reservation is to be applied.

24. The base station of claim 14, wherein the one or more processors are further configured to:
  estimate channel responses of the downlink channels, and
  apply the tone reservation signaling to one or more subcarriers of one or more of the downlink channels based at least in part on expected received energies on the one or more subcarriers or capacity of the one or more subcarriers.

25. The base station of claim 24, wherein the one or more processors, to estimate the channel responses of the downlink channels, are configured to estimate the channel responses of the downlink channels based at least in part on one or more of:
  uplink reference signals, or
  one or more reports of channel responses of the downlink channels.

26. The base station of claim 14, wherein the one or more processors are further configured to:
  transmit an indication of whether subcarriers having the tone reservation signaling are to have log-likelihood ratios (LLRs) zeroed out or omitted from demodulation and decoding operations.

27. A method of wireless communication performed by a user equipment (UE), comprising:
  transmitting an indication of a tolerance for interference associated with peak-to-average-power-ratio (PAPR) signaling, the PAPR signaling including space frequency multi-user (SFMU) signaling and tone reservation signaling; and
  receiving, via a downlink channel, a downlink communication having the PAPR signaling applied to subcarriers of the downlink channel based at least in part on the indication of the tolerance for interference.

28. The method of claim 27, wherein the tolerance for interference is based at least in part on one or more of:
  channel conditions of a downlink channel associated with the downlink communication, or
  a signal-to-interference-plus-noise ratio (SINR) associated with the downlink channel associated with the downlink communication.

29. A method of wireless communication performed by a base station, comprising:
  receiving, from one or more user equipment (UEs), one or more indications of tolerance for interference associated with peak-to-average-power-ratio (PAPR) signaling, the PAPR signaling including space frequency multi-user (SFMU) signaling and tone reservation signaling; and transmitting, via downlink channels of a cell provided by the base station, the PAPR signaling and one or more downlink communications associated with the one or more UEs, the PAPR signaling including one or more of channel response-based SFMU signaling or channel response-based tone reservation signaling applied based at least in part on the one or more indications of the tolerance for interference.

30. The method of claim 29, further comprising:

generating, based at least in part the one or more indications of tolerance for interference, a data set that indicates tolerances for interference for multiple spatial portions of the cell provided by the base station.

* * * * *